US012771082B2

(12) United States Patent
Crighton et al.

(10) Patent No.: US 12,771,082 B2
(45) Date of Patent: Oct. 20, 2026

(54) BUSBAR ASSEMBLY

(71) Applicant: Molex, LLC, Lisle, IL (US)

(72) Inventors: Alan Crighton, Austin, TX (US); Timothy R. Gregori, New Lenox, IL (US)

(73) Assignee: Molex, LLC, Lisle, IL (US)

( * ) Notice: Subject to any disclaimer, the term of this patent is extended or adjusted under 35 U.S.C. 154(b) by 267 days.

(21) Appl. No.: 18/580,160

(22) PCT Filed: Jun. 27, 2022

(86) PCT No.: PCT/IB2022/055956
§ 371 (c)(1),
(2) Date: Jan. 18, 2024

(87) PCT Pub. No.: WO2023/002277
PCT Pub. Date: Jan. 26, 2023

(65) Prior Publication Data
US 2025/0087950 A1 Mar. 13, 2025

Related U.S. Application Data

(60) Provisional application No. 63/223,088, filed on Jul. 19, 2021.

(51) Int. Cl.
*H01R 25/16* (2006.01)

(52) U.S. Cl.
CPC .................................. *H01R 25/162* (2013.01)

(58) Field of Classification Search
CPC .................................................... H01R 25/162
USPC .......................................................... 439/119
See application file for complete search history.

(56) References Cited

U.S. PATENT DOCUMENTS

| | | | | |
|---|---|---|---|---|
| 6,203,343 | B1 * | 3/2001 | Chevassus-More | B60R 16/0207 174/72 B |
| 6,234,842 | B1 * | 5/2001 | Keay | H01R 4/646 439/620.24 |
| 8,258,404 | B2 | 9/2012 | Latimer | |
| 9,337,597 | B2 * | 5/2016 | Daamen | H01R 13/629 |
| 10,290,986 | B2 | 5/2019 | Pever | |
| 11,177,599 | B2 * | 11/2021 | Horning | H01R 13/426 |
| 11,404,806 | B2 * | 8/2022 | Chen | H01R 12/7088 |
| 2013/0327570 | A1 * | 12/2013 | Bhathija | H01R 25/162 174/88 R |
| 2023/0114958 | A1 * | 4/2023 | Horning | H01R 13/504 439/544 |

FOREIGN PATENT DOCUMENTS

| | | |
|---|---|---|
| CN | 103474848 A | 12/2013 |
| CN | 103579801 A | 2/2014 |

(Continued)

OTHER PUBLICATIONS

International Search Report and Written Opinion received for PCT Application No. PCT/IB2022/055956, mailed on Oct. 6, 2022, 6 pages.

*Primary Examiner* — Tulsidas C Patel

(57) ABSTRACT

A busbar assembly includes first and second rigid and elongated conductive busbars, an insulator sandwiched between first portions of the busbars, and a signal connector sandwiched between second portions of the busbars. The signal connector has an insulative housing and a conductive signal terminal mounted therein.

20 Claims, 5 Drawing Sheets

(56) References Cited

FOREIGN PATENT DOCUMENTS

| | | | |
|---|---|---|---|
| CN | 104283117 | A | 1/2015 |
| CN | 111490420 | A | 8/2020 |
| TW | M601916 | U | 9/2020 |
| TW | I708440 | B | 10/2020 |

* cited by examiner

BUSBAR ASSEMBLY

RELATED APPLICATIONS

This application is a national phase of PCT/IB2022/055956, filed on Jun. 27, 2022, which claims priority to U.S. Provisional Application No. 63/223,088 filed on Jul. 19, 2021, the disclosures of which are incorporated herein in their entireties by reference.

FIELD OF THE DISCLOSURE

The present disclosure is directed to a busbar assembly and the combination of a busbar assembly and an electrical connector.

DESCRIPTION OF RELATED ART

Busbar assemblies are commonly used in electrical power distribution systems in order to distribute electrical power from a power source to a number of electrical devices, such as server and switches. In electric power distribution systems, a busbar is a metallic strip or bar, typically housed inside switchgear, panel boards, and busway enclosures for local high current power distribution. The busbars are also used to connect high voltage equipment at electrical switchyards, and low voltage equipment in battery banks.

Typically, power distribution with busbars is limited to power only, and has no method of incorporating signals, except for a secondary cable assembly that requires separate plug-up in addition to the busbar itself. Certain individuals can appreciate an alternate construction whereby signal transmission is accommodated within the busbar assembly, thereby conserving space.

BRIEF SUMMARY

Accordingly, the present disclosure provides an improved busbar assembly.

In an embodiment, a busbar assembly includes first and second rigid and elongated conductive busbars, an insulator sandwiched between first portions of the busbars, and a signal connector sandwiched between second portions of the busbars. The signal connector has an insulative housing and a conductive signal terminal mounted therein.

In an embodiment, a busbar assembly includes first and second rigid and elongated conductive busbars, an insulator sandwiched between first portions of the busbars, a signal connector sandwiched between second portions of the busbars. Each busbar has a first portion and a second portion extending therefrom. Each second portion has a first section extending from the first portion and a second section extending from the first section. The first portions are parallel to each other. The second sections are parallel to each other and parallel to the first sections. The first section is angled relative to the first portion and to the second section in each busbar. The signal connector includes an insulative housing, a plurality of conductive signal terminals mounted in the insulative housing and a plurality of cables coupled to the signal terminals. The insulative housing being affixed to the busbars by a lock.

BRIEF DESCRIPTION OF THE DRAWINGS

The present disclosure is illustrated by way of example, and not limited, in the accompanying figures in which like reference numerals indicate similar elements and in which.

DETAILED DESCRIPTION

Figure 1:
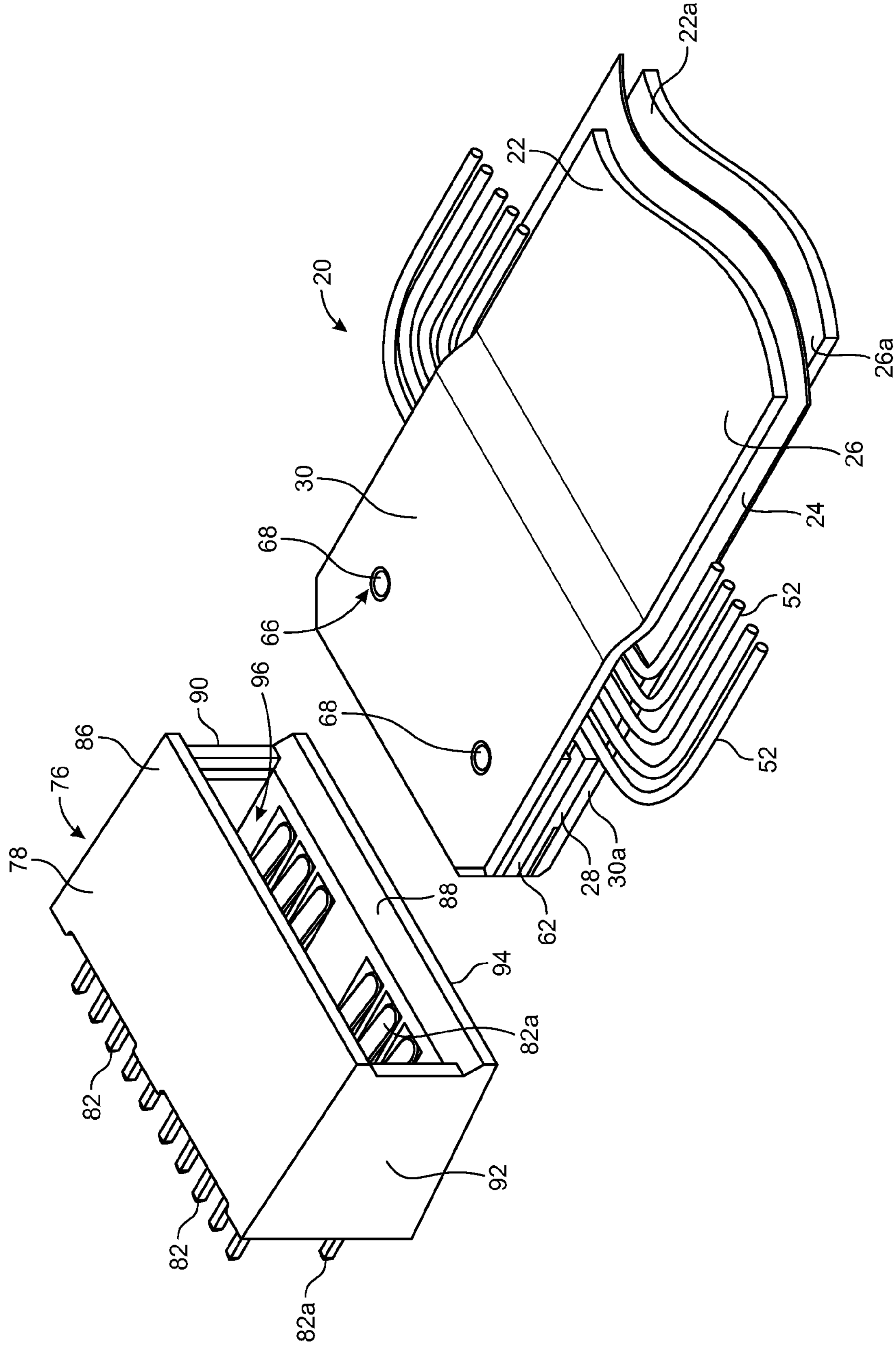
FIG. 1 depicts a perspective view of a busbar assembly and a mating connector according to a first embodiment.

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Directional terms such as front, rear, horizontal, vertical and the like are used for ease in explanation, and do not denote a required orientation in use.

A busbar assembly 20 includes a first rigid and elongated conductive busbar 22, a second rigid and elongated conductive busbar **22*a*, an insulator 24 sandwiched between first portions 26, 26*a* of the busbars 22, 22*a*, and a signal connector 28 sandwiched between second portions 30, 30*a* of the busbars 22, 22*a* which extend from the first portions 26, 26*a* and are integrally formed therewith. Each busbar 22, 22*a* has a first surface 34, 34*a* and an opposite second surface 36, 36*a***. One busbar provides a feed, and the other busbar provides a return.

The first portions 26, **26*a* are planar and opposite surfaces 34, 34*a*, 36, 36*a* of each first portion 26, 26*a* are parallel to each other. A longitudinal plane 38, 38*a* is defined between the opposite surfaces 34, 34*a*, 36, 36*a* of each first portion 26, 26*a*. The first portion 26 of the busbar 22 is parallel to the first portion 26*a* of the busbar 22*a* and the surfaces 34, 34*a* face the insulator 24. The insulator 24 prevents electrical communication between the first portions 26, 26*a* of the busbars 22, 22*a*. The busbars 22, 22*a* and the insulator 24 are permanently affixed together in a sandwich construction. The first portions 26, 26*a* are configured to be gripped on the surfaces 36, 36*a*** by a busbar connector (not shown).

Figure 4:
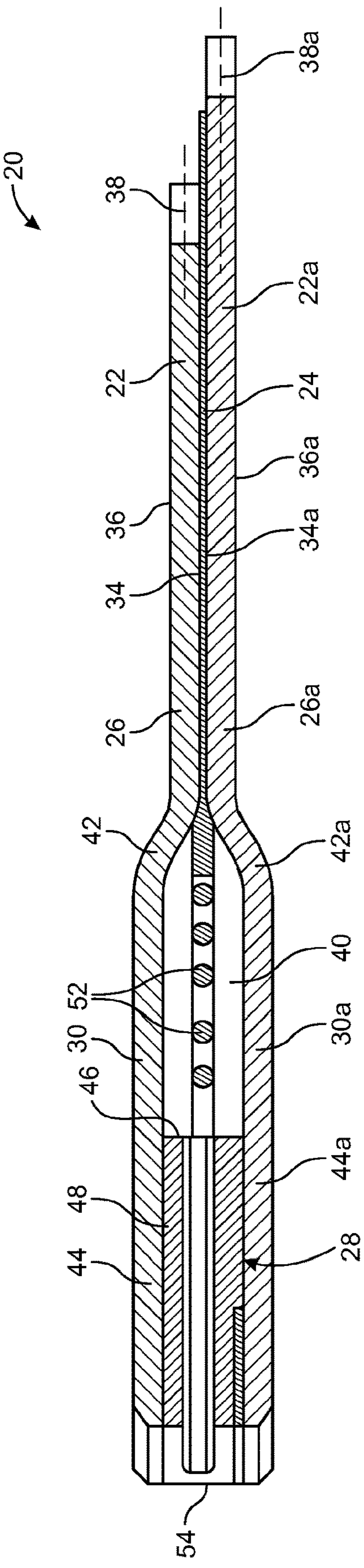
FIG. 4 depicts a cross-sectional view of the busbar assembly along line 4-4 of FIG. 3.
Figure 5:
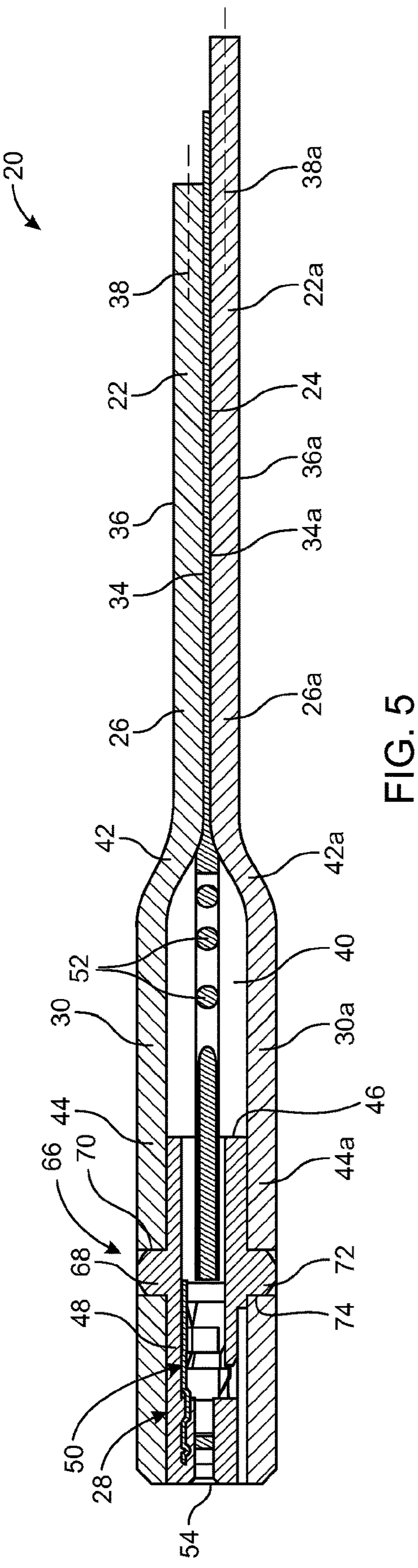
FIG. 5 depicts a cross-sectional view of the busbar assembly along line 5-5 of FIG. 3.
Figure 6:
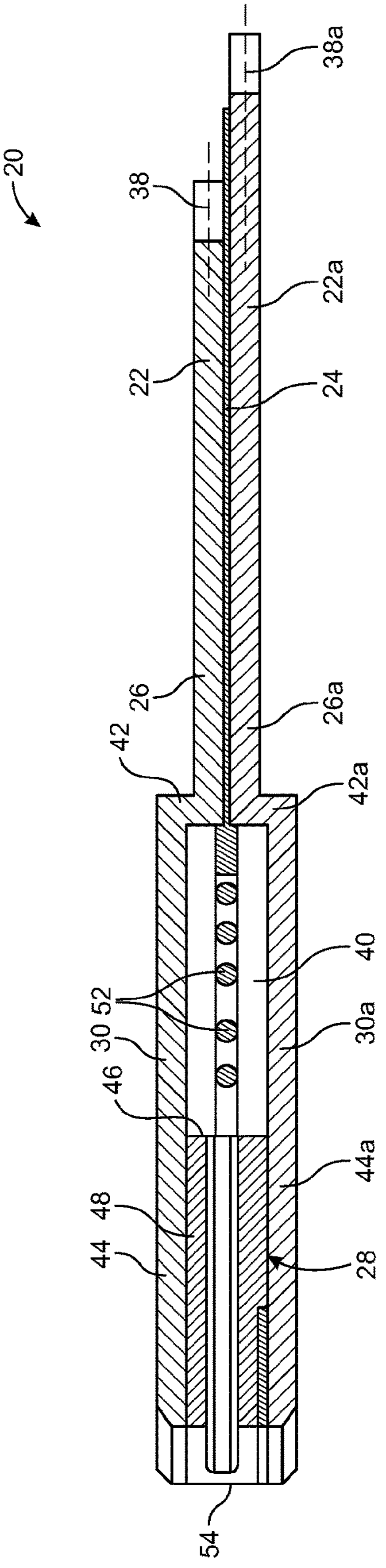
FIG. 6 depicts a cross-sectional view of a busbar assembly according to a second embodiment.
Figure 7:
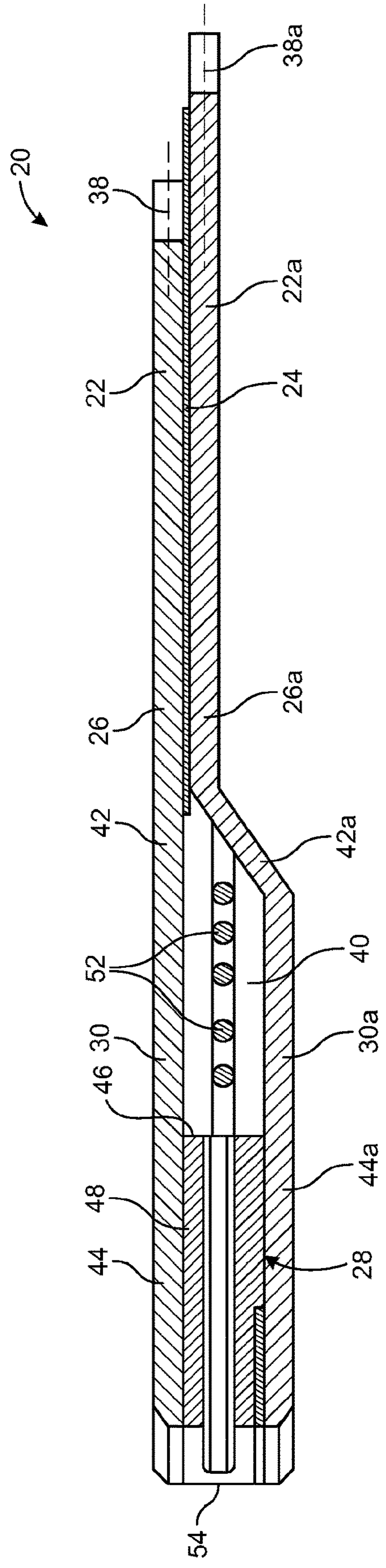
FIG. 7 depicts a cross-sectional view of a busbar assembly according to a third embodiment.

The second portions 30, **30*a* of the busbars 22, 22*a* are offset from each other such that a signal connector receiving space 40 is formed therebetween. Each second portion 30, 30*a* includes a first section 42, 42*a* that extends from the first portion 26, 26*a*, and a planar second section 44, 44*a* extending from the first section 42, 42*a*. As shown in FIGS. 4 and 6, each first section 42, 42*a* is angled relative to the first portion 26, 26*a* and extends outwardly from each other, for example at a forty-five (45) degree angle, or about a forty-five (45) degree angle, relative to the planes 38, 38*a* such that an included angle of ninety (90) degrees is provided between the first portions 26, 26*a* as shown in FIG. 4, or for example at a ninety (90) degree angle, or about a ninety (90) degree angle, relative to the planes 38, 38***a* such that an included angle of one hundred eighty (180) degrees is provided between the first portions 26, 26*a* as shown in FIG. 6. Alternatively, the first sections 42, 42*a* may be provided at different angles relative to the planes 38, 38*a*, for example first section 42 is angled at forty-five (45) degrees and first section 42*a* is angled at ninety (90) degrees. Any desired degree of angling of the first section(s) 42, 42*a* can be provided such that the signal connector receiving space 40 is formed. The second sections 44, 44*a* are parallel to each other and are parallel to the first portions 26, 26*a*. In an embodiment as shown in FIG. 7, one of the second portions 30, 30*a*, for example second portion 30, is coplanar with the first portion 26, and the second portion 30*a* includes the first section 42*a* and the second section 44*a*.

The signal connector 28 seats within the signal connector receiving space 40 between the second sections 44, 44*a*, and the surfaces 34, 34*a* of the busbars 22, 22*a* face the signal connector 28. A portion of the signal connector receiving space 40 is provided between a rear end surface 46 of the signal connector 28 and the first section 42, 42*a* of the busbars 22, 22*a*. The signal connector 28 prevents electrical communication between the second portions 30, 30*a* of the busbars 22, 22*a*. The busbars 22, 22*a* and the signal connector 28 are permanently affixed together in a sandwich construction.

Figure 2:
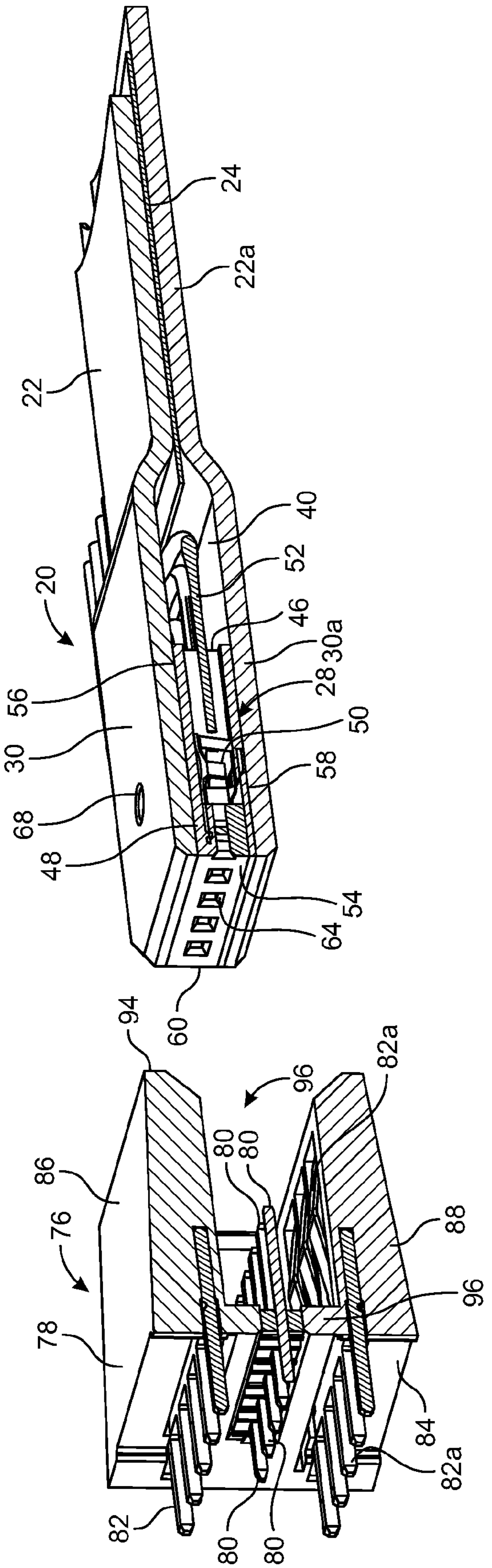
FIG. 2 depicts a cross-sectional view, shown in perspective of busbar assembly and mating connector of FIG. 1.
Figure 3:
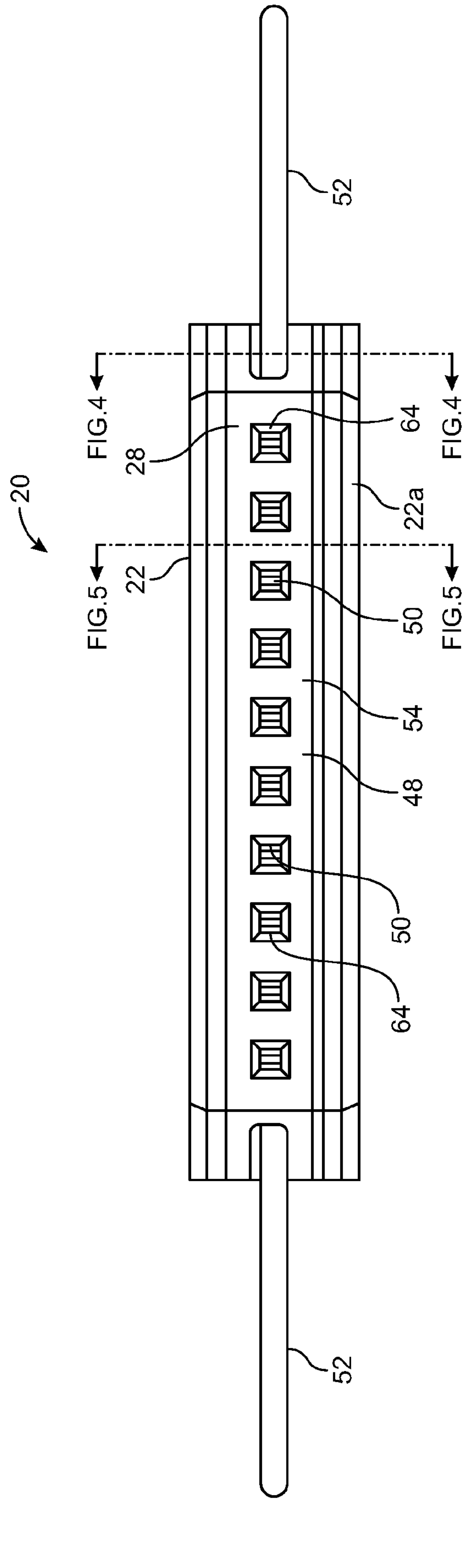
FIG. 3 depicts a front plan view of the perspective view of the busbar assembly.

As shown in FIG. 2, the signal connector 28 includes an insulative housing 48, a plurality of conductive electrical signal terminals 50 mounted within the housing 48, and a plurality of cables 52, each of which is mated to one of the signal terminals 50. In an embodiment, the signal connector 28 includes a single electrical signal terminal 50 mounted within the housing 48, and a single cable 52 mated thereto. The housing 48 has a front end surface 54 opposite to the rear end surface 46, and top, bottom and side surfaces 56, 58, 60, 62 extending between the front and rear end surfaces 54, 46 and forming a plurality of spaced apart passageways 64. Each passageway 64 extends longitudinally from an opening at the front end surface 54 to an opening at the rear end surface 46. The passageways 64 may be aligned in a row. The signal terminals 50 distribute signals from the cables 52 to an electrical device (not shown). Each signal terminal 50 may be formed from a body, a pair of wings extending from a rear end of the body, and a pair of flexible contact beams extending from the front end of the body. Each signal terminal 50 seats within a front portion of the passageway 64 and the flexible contact beams face the front opening of the housing 48. Suitable engagements are provided to secure the signal terminals 50 within the passageways 64.

The top surface 56 abuts against the first surface 34 of the second portion 30 of the busbar 22, and the bottom surface 58 against the first surface 34*a* of the second portion 30*a* of the busbar 22*a*. The busbars 22, 22*a* and the signal connector 28 are locked together by a lock 66 to prevent the signal connector 28 from separating from the busbars 22, 22*a*. In an embodiment, the lock 66 is formed by a projection 68 extending from the top surface 56 of the housing 48 which seats within a like formed opening 70 in the second portion 30 of the busbar 22, and a projection 72 extending from the bottom surface 58 of the housing 48 which seats within a like formed opening 74 in the second portion 30*a* of the busbar 22*a*. In an embodiment, the lock 66 is formed by a single projection and opening. The signal connector 28 can be easily snap-fit between the busbars 22, 22*a*. Other locks 66 are within the scope of the present disclosure.

In use, each cable 52 is routed through the signal connector receiving space 40 such that the cable 52 passes partially between the busbars 22, 22*a*. The cable 52 is inserted through the rear opening of the housing 48 and into one of passageways 64. Prior to insertion, a portion of an insulative jacket of the cable 52 is removed and the wings of the signal terminals 50 are crimped to an exposed wire of the cable 52. The cables 52 exit through sides of the busbar assembly 20.

An electrical connector 76 which mates to the busbar assembly 20 includes an insulative housing 78, a row of electrical signal contacts 80 mounted within the housing 78, a row of power contacts 82 mounted within the housing 78 on one side of the signal contacts 80, and a row of power contacts 82*a* mounted within the housing 78 on the opposite side of the signal contacts 80. The housing 78 has a rear wall 84 and top, bottom and side walls 86, 88, 90, 92 extending therefrom to a front end 94. The walls 84, 86, 88, 90, 92 define a central cavity 96 which extends from the front end 94 to a plurality of passageways through the rear wall 84 through which the signal contacts 80 extend, to a plurality of passageways in the rear wall 84 through which the power contacts 82 extend, and to a plurality of passageways in the rear wall 84 through which the power contacts 82*a* extend. The contacts 80, 82, 82*a* extend into the cavity 96, with the power contacts 82 being positioned proximate to the top wall 86 and the power contacts 82*a* being positioned proximate to the bottom wall 88 such that the signal contacts 80 are between the power contacts 82, 82*a*. Alternatively, the signal contacts 80 may be provided as a discrete connector that is inserted/fitted into a corresponding opening within the housing 78.

The busbar assembly 20 seats through the front end 94 and into the cavity 96. The signal contacts 80 enter into the passageways 64 and mate with the signal terminals 50. The power contacts 82 mate with the busbar 22, and the power contacts 82*a* mate with the busbar 22*a*. This allows for a single insertion/extraction of the busbar assembly 20 into and out of the connector 76, without requiring a secondary cable assembly.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims. Further, the foregoing descriptions describe methods that recite the performance of a number of steps. Unless stated to the contrary, one or more steps within a method may not be required, one or more steps may be performed in a different order than as described, and one or more steps may be formed substantially contemporaneously. Finally, the drawings are not necessarily drawn to scale.

We claim:

1. A busbar assembly, comprising:

a first busbar and a second busbar each being a rigid, elongated conductive busbar;

an insulator sandwiched between first portions of the first busbar and the second busbar; and a signal connector sandwiched between second portions of the first busbar and the second busbar, the signal connector comprising an insulative housing and a conductive signal terminal mounted therein, the insulative housing having opposite surfaces abutting against respective surfaces of the second portions of the busbars.

2. The busbar assembly of claim 1, wherein each second portion has a first section extending from the first portion and a second section extending from the first section, wherein at least one of the first sections is angled relative to the respective first portion and to the respective second section.

3. The busbar assembly of claim 2, wherein the first portion and the second section are parallel to each other.

4. The busbar assembly of claim 2, wherein the at least one first section is angled relative to the first portion at an angle of about forty-five (45) degrees to about ninety (90) degrees.

5. The busbar assembly of claim 4, wherein the first portion and the second section are parallel to each other.

6. The busbar assembly of claim 1, wherein the signal connector further comprises a cable coupled to the signal terminal, the cable exiting through a side of the busbar assembly.

7. The busbar assembly of claim 1, wherein the signal connector comprises a plurality of signal terminals mounted in the insulative housing and a cable coupled to each signal terminal, the cables extending outward from the busbars.

8. The busbar assembly of claim 1, wherein each second portion has a first section extending from the first portion and a second section extending from the first section, wherein the first section is angled relative to the first portion and to the second section in each busbar.

9. The busbar assembly of claim 8, wherein the first portion and the second section are parallel to each other in each of the first busbar and the second busbar.

10. The busbar assembly of claim 8, wherein the first section is angled relative to the first portion at an angle of about forty-five (45) degrees to about ninety (90) degrees in each busbar.

11. The busbar assembly of claim 10, wherein the first portion and the second section are parallel to each other in each of the first busbar and the second busbar.

12. The busbar assembly of claim 8, wherein the signal connector further comprises a cable coupled to the signal terminal.

13. The busbar assembly of claim 8, wherein the signal connector comprises a plurality of signal terminals mounted in the insulative housing and a cable coupled to each signal terminal, the cables extending outward from the busbars.

14. The busbar assembly of claim 1, wherein the insulative housing is affixed to at least one of the busbars by a lock.

15. The busbar assembly of claim 14, wherein the lock comprises a projection extending from the insulative housing into an opening in the first busbar.

16. The busbar assembly of claim 14, wherein the lock comprises a first projection extending from the insulative housing into a first opening in the first busbar, and a second projection extending from the insulative housing into a second opening in the second busbar.

17. A busbar assembly, comprising:

a first busbar and a second busbar each being a rigid, elongated conductive busbar, each of the first busbar and the second busbar having a first portion and a second portion extending therefrom, each second portion having a first section extending from the first portion and a second section extending from the first section, the first portions being parallel to each other, the second sections being parallel to each other and parallel to the first sections, the first section being angled relative to the first portion and to the second section in each busbar;

an insulator sandwiched between first portions of the busbars; and a signal connector sandwiched between second portions of the busbars, the signal connector comprising an insulative housing, a plurality of conductive signal terminals mounted in the insulative housing, and a plurality of cables coupled to the signal terminals, the insulative housing being affixed to the busbars by a lock, and the insulative housing having opposite surfaces abutting against respective surfaces of the second portions of the busbars.

18. A busbar assembly, comprising:

a first busbar being a rigid and elongated conductive busbar, the first busbar comprising a first portion and a second portion extending therefrom, the second portion having a first section extending from the first portion and a planar second section extending from the first section, the first section being angled relative to the first portion and to the second section;

a second busbar being a rigid and elongated conductive busbar, the second busbar comprising a first portion and a second portion extending therefrom, the second portion having a first section extending from the first portion and a planar second section extending from the first section, the first section being angled relative to the first portion and to the second section;

wherein the first portions of the first and second busbars are parallel to each other, and the second sections of the first and second busbars are parallel to each other and parallel to the first portions;

an insulator sandwiched between the first portions of the busbars; and a signal connector sandwiched between the second portions of the busbars within a signal connector receiving space formed between the second sections, the signal connector comprising an insulative housing having a top surface abutting against a surface of the second portion of the first busbar and a bottom surface abutting against a surface of the second portion of the second busbar.

19. The busbar assembly of claim 18, further comprising:

a plurality of conductive signal terminals mounted within the insulative housing; and a plurality of cables, each cable mated to one of the signal terminals and routed through the signal connector receiving space such that the cables exit through sides of the busbar assembly.

20. The busbar assembly of claim 18, further comprising a lock comprising a first projection extending from the top surface of the insulative housing into a first opening in the second portion of the first busbar, and a second projection extending from the bottom surface of the insulative housing into a second opening in the second portion of the second busbar.

* * * * *